Figure 1:
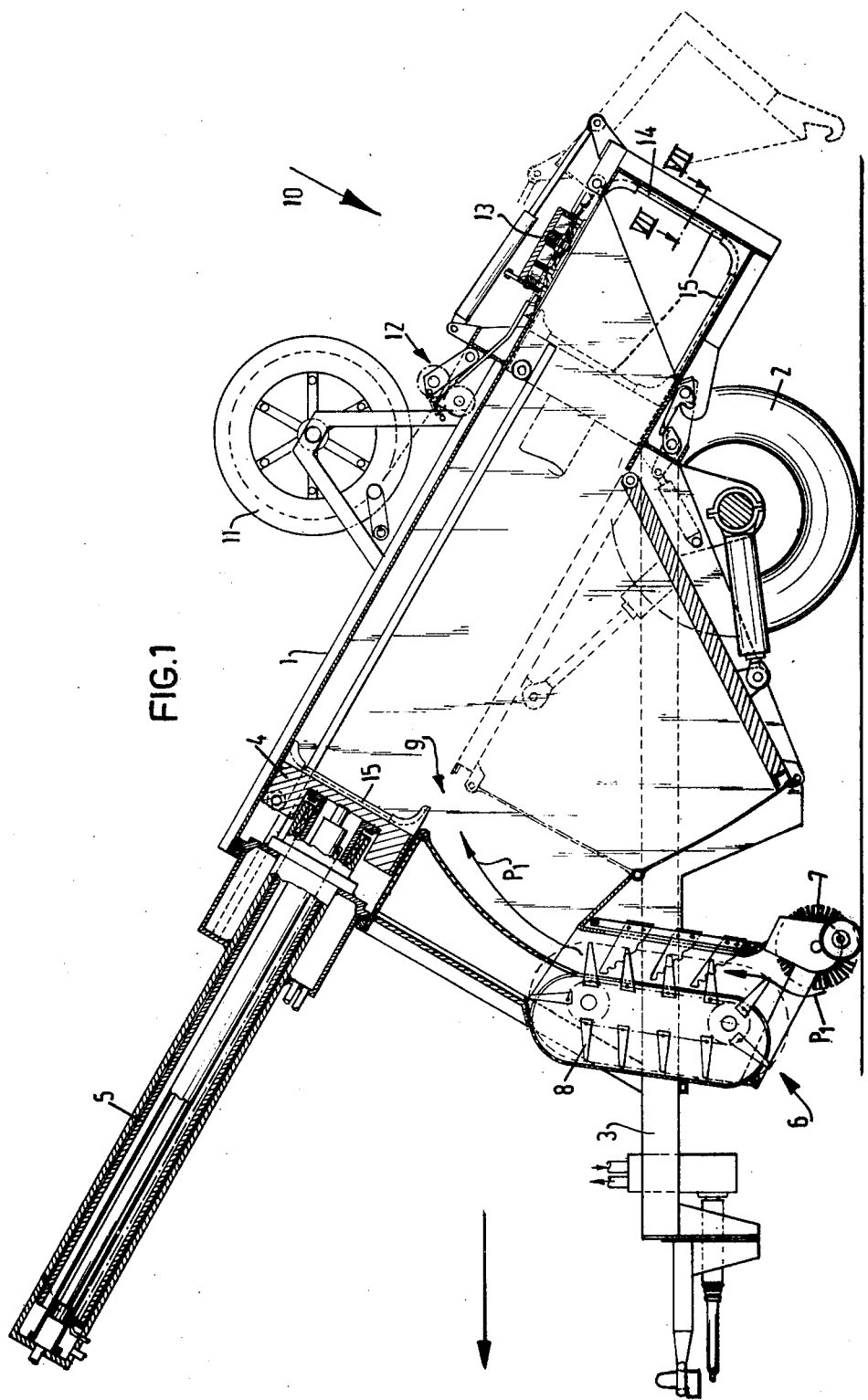

United States Patent [19]

Oosterling et al.

[11] 4,151,793
[45] May 1, 1979

[54] DEVICE FOR BALING CROP COMPRISING A MECHANISM FOR BINDING THE BALES

[75] Inventors: Pieter A. Oosterling, Nieuw-Vennep; Adriaan Van Zweeden, Rijsenhout, both of Netherlands

[73] Assignee: Expert N.V., Willemstad, Netherlands Antilles

[21] Appl. No.: 811,175

[22] Filed: Jun. 29, 1977

[30] Foreign Application Priority Data

Jun. 30, 1976 [NL] Netherlands ........................ 7607221
Nov. 5, 1976 [NL] Netherlands ........................ 7612342

[51] Int. Cl.² ............................................ B65B 13/04
[52] U.S. Cl. ........................................ 100/26; 100/3; 100/31
[58] Field of Search ..................... 100/26, 3, 31, 249, 100/250, 251, 100

[56] References Cited

U.S. PATENT DOCUMENTS

| | | | |
|---|---|---|---|
| 3,426,672 | 2/1969 | Nolt | 100/250 X |
| 3,450,028 | 6/1969 | Goland | 100/26 X |
| 3,895,572 | 7/1975 | Nitschke | 100/3 X |
| 3,939,762 | 2/1976 | Smitherman | 100/26 X |

Primary Examiner—Billy J. Wilhite
Attorney, Agent, or Firm—John P. Snyder

[57] ABSTRACT

A device for baling crop, for example, grass, hay or the like, comprising a compression chamber and a driven plunger reciprocating in said chamber as well as a binding means adapted to bind a bale still located in the compression chamber; the compression chamber and the plunger are each provided with at least one channel opening towards the compression space so that in the extreme pressing position of the plunger the channel of the compression chamber and that of the plunger constitute an uninterrupted, annular conduit for passing a length of binder, whilst a mechanism is provided for interconnecting the two ends of the length of binder.

14 Claims, 10 Drawing Figures

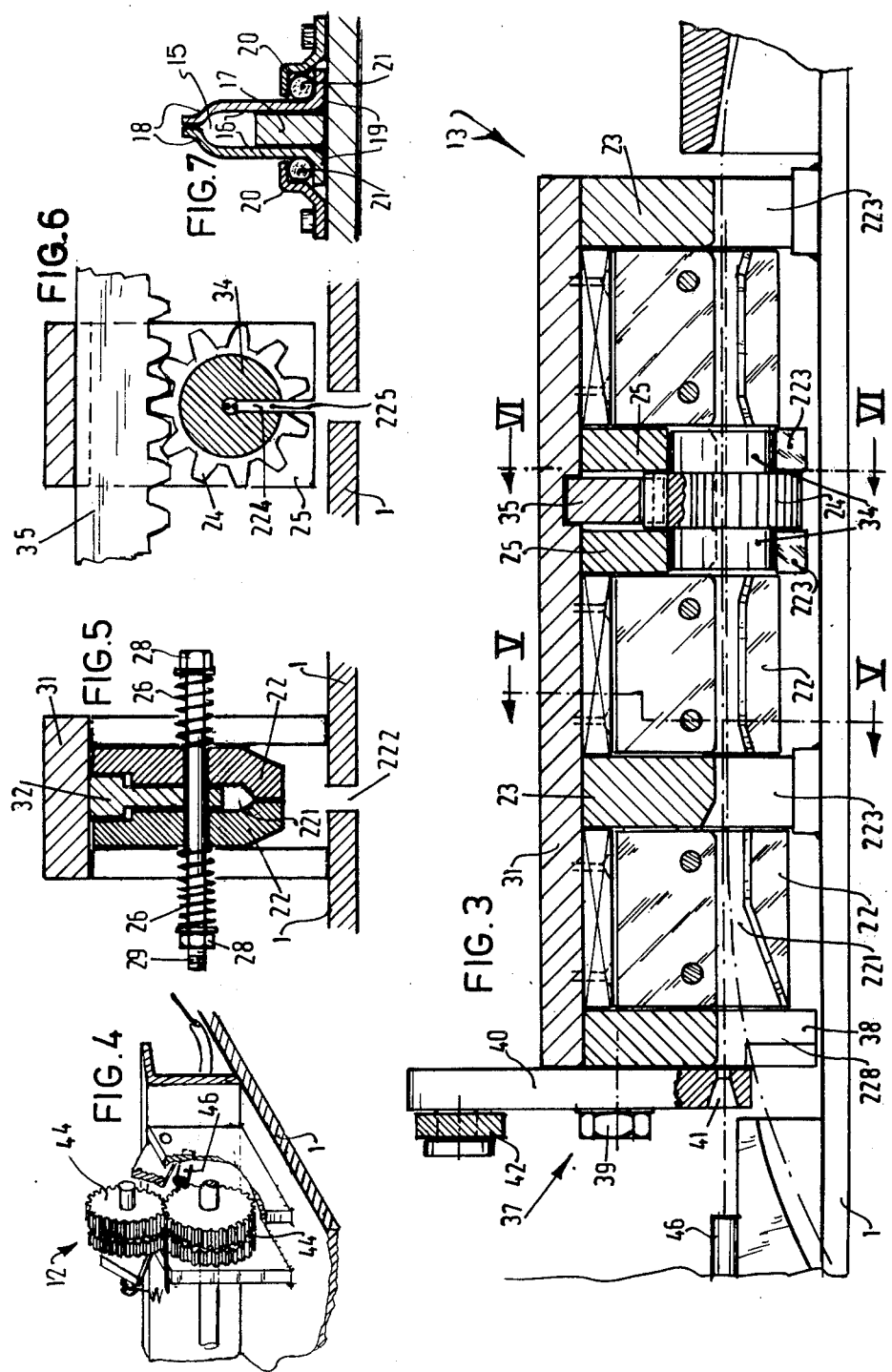

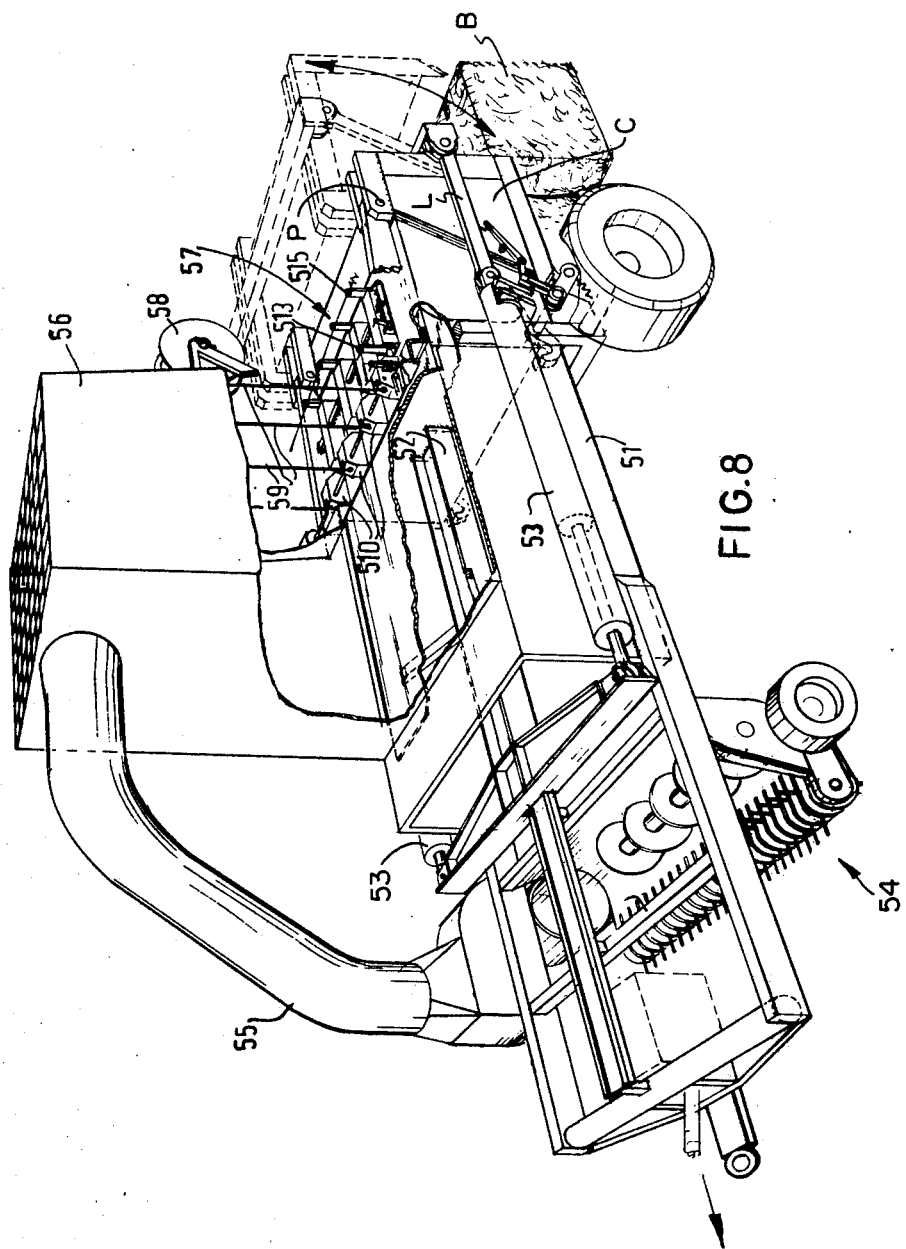

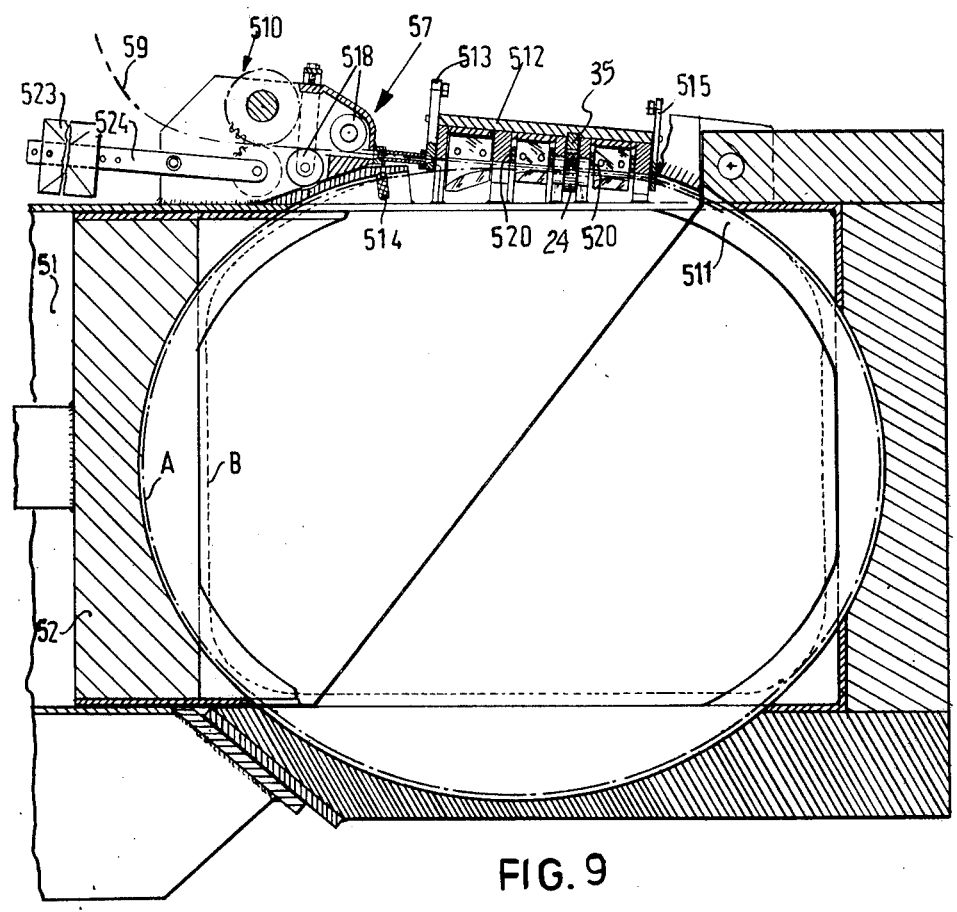
FIG. 9
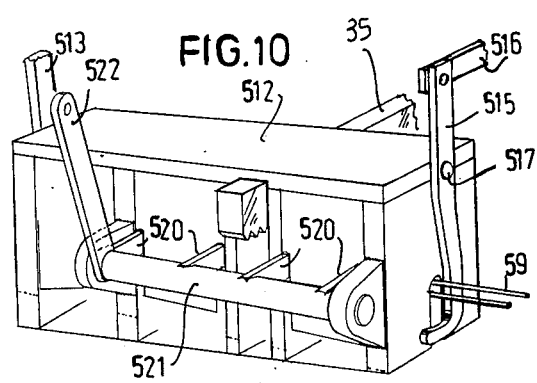

DEVICE FOR BALING CROP COMPRISING A MECHANISM FOR BINDING THE BALES

The invention relates to a device for baling crop, for example, grass, hay or the like, comprising a compression chamber and a driven plunger reciprocating in said chamber.

The invention has for its object to provide a mechanism for binding the compressed bale, which is particularly suitable for use in the device of the kind set forth. Binding is performed therein so that the bale still present in the compression chamber is enveloped by a binding element as a result of which the compressed state of the bale is maintained after the delivery from the compression chamber.

For this purpose the compression chamber and the plunger of the pressing device are each provided with at least one channel opening towards the compression space so that in the extreme pressing position of the plunger the channel of the compression chamber and that of the plunger constitue an uninterrupted, annular conduit for passing a length of binder, whilst a mechanism is provided for interconnecting the two ends of the length of binder.

The advantage of such a conduit in the compression chamber is that the bale can be enveloped prior to the retraction of the plunger and prior to the opening of the compression chamber. This advantage is of particular importance when large bales of crop have to be compressed, that is to say, bales three to four times the size of the so-called "straw bales," said bales having a comparatively high specific weight.

Since the channel opens towards the compression space, the binder can be released from the channel when the enveloped is removed from the compression chamber.

In a preferred embodiment at least part of the channel is formed between two parallel ridges on the inner wall of the compression chamber and on the pressing side of the ram. In this way the compression chamber and the ram are not undesirably weakened, which is important in the case of high compression powers.

In order to prevent the crop from penetrating into the channel in this preferred embodiment, the edges of the ridges are bent over towards one another, whilst the ridges can deflect away from one another so that the binder can be drawn out of the channel.

According to the invention the fastening mechanism is constructed as a part of the channel, which part is rotatable about an axis parallel to the direction of guiding. After the two ends of the binder have passed through the rotatable part and after this part has turned, the two ends can be twisted and hence connected with one another.

In order to ensure a firm fastening of said two ends rigid, undeformable channel portions are provided on either side of the rotatable part for locally retaining the two end parts of the binder.

A further object of invention is to adapt the mechanism and the associated channel-like guide in the compression chamber so that a comparatively rigid binder, for example, iron wire may be employed. The length of binder is pushed into the guide channel, through which the front end has to find its passage, which can be performed unhindred by flexible or resilient material. However, when rigid or less resilient binders are used, a front end of the binder once bent beyond its limit of elasticity will maintain its bent state in the straight portions of the channel like in a compression space of polygonal cross-section, which may result in that the binder may snap out of the guide channel.

The embodiment according to the invention is distinguished in that the bottom of the channel extends along a flowing curve having radii of curvature differing from infinite value.

Owing to this shape of the channel the front end of the comparatively rigid binder will not be permanently deformed or only so to a small extent so that the binder can be passed unhindered around the bale and subsequently be tightened.

In order to restrict the length of the passed binder the bottom of the channel in the straight portions of the polygonal cross section extends outside and at the corners inside the circumference of the compression space. Owing to this feature of the invention the length of the binder will only slightly exceed the circumferential length of the compression space.

In a preferred embodiment of the invention the binding device is provided with a binder feeding mechanism operating in a reversible sense, which means that this feeding mechanism first serves for passing the binder through the guide channel, after which this binder can be withdrawn over a predetermined length. It is important in this respect that, viewed in the direction of passage, in front of the fastening mechanism the channel is provided with a clamping member, which can retain temporarily the length of binder not yet fastened when the binder is withdrawn by the feeding mechanism.

Figure 2:
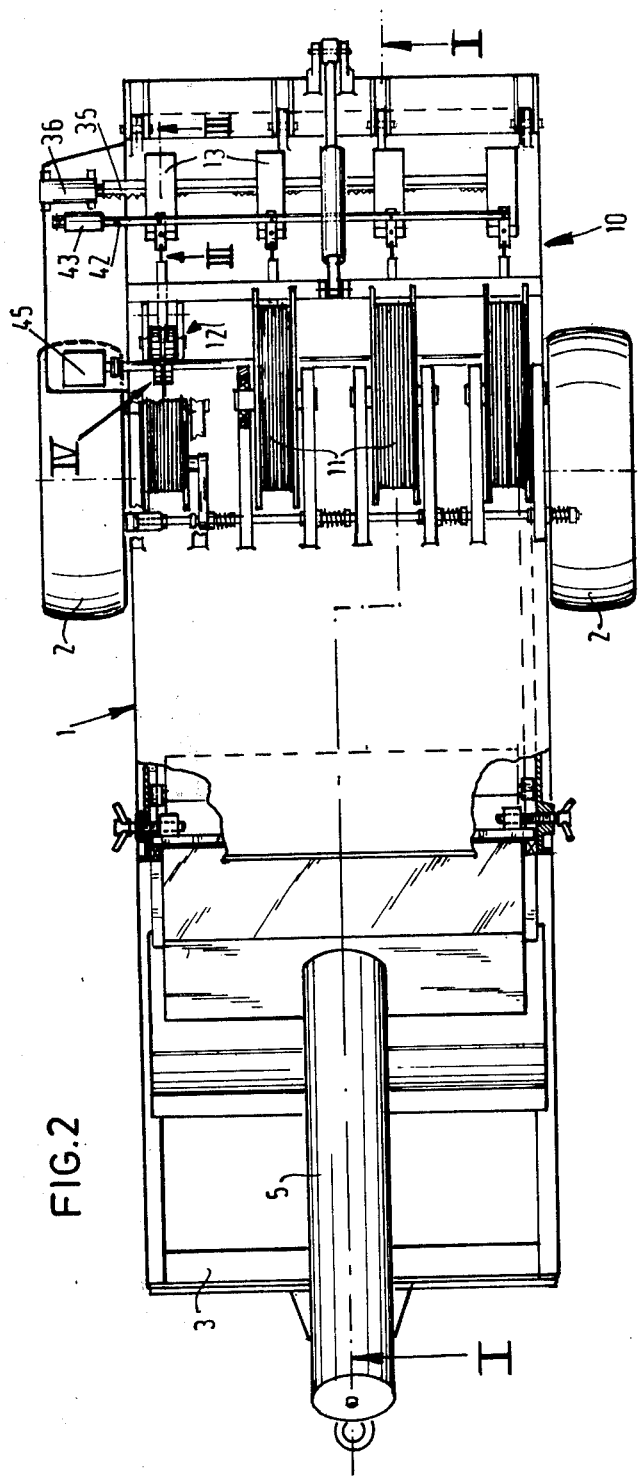

Other features and advantages of the invention will become apparent from the following description of two embodiments. In the drawing:

FIG. 1 is a side elevation and partly a longitudinal sectional view of a mobile baler comprising a binding mechanism, FIG. 2 is a plan view of the device shown in FIG. 1, FIG. 3 is a longitudinal sectional view of a detail showing the fastening mechanism, FIG. 4 is a perspective view of a further detail of the fastening mechanism, FIG. 5 is a cross-sectional view taken on the line V—V in FIG. 3, FIG. 6 is a cross-sectional view taken on the line VI—VI in FIG. 3, FIG. 7 is a cross-sectional view taken on the line VII—VII in FIG. 1.

FIG. 8 is a perspective view of a second embodiment of a baler for compressing bales of crop comprising a binding mechanism of a different type, FIG. 9 is a cross-sectional view of the compression space with the plunger in the pressing position and the binding mechanism in FIG. 8 in detail, FIG. 10 is a perspective view of part of the binding mechanism in FIGS. 8 and 9.

In the first embodiment shown the compression chamber 1 is arranged in an inclined position on a frame 3, which is mobile by the wheels 2. A plunger 4 is adapted to reciprocate in the compression chamber 1 and this movement is generated by means of a hydraulic cylinder 5, whose operation will not be described in detail, because this is beyond the scope of this invention. Beneath the compression chamber is arranged a pick-up and elevating device 6, which picks up the crop from the ground by means of the roller 7 and conveys it by means of the conveyor 8 in the direction of the arrow P₁ through the inlet opening 9 into the compression chamber 1.

According to the invention the baling device is provided with a binding mechanism generally designated by 10 on the side of the compression chamber 1 remote from the inlet opening 9.

In the first embodiment shown the binding mechanism comprises a plurality of identical units arranged side by side and formed each by a stock reel 11, a conveying member 12, a fastening mechanism 13 and a guide 14 formed by channels on the inner wall of the compression chamber and on the pressing side of the plunger 4. From FIG. 1 it will be apparent that also by corner pieces arranged between the channels the guide forms a closed ring when the plunger 4 is in the pressing position or below in the compression chamber 1 (see the broken line).

FIG. 7 shows a cross-section of the channel, which is formed by two ridges 16 arranged at a distance from one another by an element 17 the top end of each of which is bent over at 18 so that they engage one another. The lower end is also bent over at 19 in order to fix this end by means of clamps 20 to be secured to the wall of the compression chamber and to the plunger respectively. Between the clamp 20 and the lower end 19 is arranged a resilient wire 21 in order to ensure easy deflection of the top ends 18 away from one another. The corner pieces are also deflectable so that a binder introduced into the guide in the direction towards the compression space can be drawn out of the channels 15.

The fastening mechanism 13 is shown in detail in FIG. 3. The channel opening towards the compression space is composed here of various adjacent parts. The relatively deflectable parts 22 (see also FIG. 5) form a closed space 221 serving as a guide for both ends of the length of binder. At the side of said parts 22 are disposed rigid parts 23 and a rotatable part 24, the latter being rotatable in bearings 25 connected with the rigid parts 23. The rigid parts 23 and 25 have an undeformable gap 223 opening towards the compression space. The rotatable part 24 also has a radial gap 224 (see FIG. 6), whilst the stubs 34 have a gap 225.

The relatively deflectable parts 22 are held in relative engagement in the embodiment shown by bias stress from two compression springs 26 bearing each on one side on the plate 22 and on the other side on a nut or the head 28 of a screw bolt 29.

The set of parts 22 can be laterally parted against the force of springs 26, are enclosed between the wall of the compression chamber 1 and a strip 31 connected herewith. A cam 32 ensures the correct position of the space 221 with respect to a slot 222 in the wall of the chamber 1.

The rotatable part 24 is constructed in the form of a toothed wheel provided on either side with a stub shaft 34 adapted to rotate in the bearings 25. The toothed wheel cooperates with a toothed rack 35, which is reciprocated by a hydraulic cylinder 36 (see FIG. 2) so that the toothed wheel will turn in one direction or the other.

At the side of the fastening mechanism is arranged a cutting member 37 formed by a stationary part 38 having a slot 228 opening towards the compression space and by a part 40 adapted to turn about a bolt 39 and having an uninterrupted hole 41. The part 40 can be turned about the bolt by means of a displaceable rod 42 so that the hole 41 is displaceable with respect to the slot 228. The rod 42 is displaced by a cylinder 43. From FIG. 2 it will be apparent that the toothed rack 35 and the rod 42 simultaneously actuate all units of the binding mechanism.

FIG. 4 shows the conveying mechanism 12 in a perspective view, from which it will be apparent that the binder drawn from the reel 11 is clamped between a pair of gear wheels 44 rolling one along the other in a groove recessed therein. The lower gear wheel is driven by a motor 45 (see FIG. 2). From the conveying member 12 the binder is inserted into a guide 46, which terminates in front of the opening 41 of the cutting member.

The device operates as follows:

The plunger compresses the crop introduced into the chamber 1 to a bale and in the extreme position the channel 15 of the plunger registers with that of the chamber. In the uninterrupted guide thus formed the binder is drawn from the reel 11 by the conveying member and pushed on through said closed guide 14 (see FIGS. 1 and 3). The propulsion is continued until the end of the binder arrives at the right-hand rigid part of the fastening mechanism (see FIG. 3). Subsequently the driving member 12 stops, after which the toothed rack is displaced. The toothed wheel starts rotating and carries along the two parts of binder in the slot 224. The two parts remain unchanged in the rigid parts 23 so that in the intermediate part the two parts are twisted around one another in the deflectable parts 22. In the meantime the cutting member has cut off the part of the binder leading to the reel. The bale thus bound can be appropriately removed by any means from the compression chamber 1 by drawing the binder out of the deflecting channels 15 and the parts 22. The device is then ready for a new cycle.

FIG. 8 shows an alternative mobile baler mainly comprising a lying compression chamber 51, in which a pressing member 52 is adapted to reciprocate. The reciprocatory movement of the pressing member 52 is produced by two hydraulic pistons 53, one on each side of the compression chamber 51. At the front the device is provided with a pick-up mechanism 54 for picking up the crop from the ground, an elevator mechanism 55 raising the picked-up crop to a collecting space 56 above the compression member 51, where the crop is temporarily retained. As soon as the pressing member 52 is in the withdrawn position, that is to say, at the left front in FIG. 8, the crop can get out of the collecting space 56 into the compression chamber 51, after which during the backward movement of the pressing member 2 the crop is compressed into a bale.

In order to retain the bale in the compressed state, one or more binders in the form of wires are passed around the compressed bale and knotted by a binding mechanism 57 arranged on top of the compression chamber (see also FIG. 9).

In the embodiment shown the binding mechanism comprises four units each having a reel 58, on which the binder is stored. The binder, in this case for example iron-wire 59, is drawn from the reel 58 by a driving mechanism 510. The driving mechanism 510 comprising two meshing gear wheels, in whose nip the iron-wire is clamped, pushes the wire through an annular channel 511 (see FIG. 9). The channel 511 is formed by two sidewalls and a bottom and open out towards the compression space in the chamber 51.

Whilst the binding wire 59 is propelled through the channel, the front end is guided by the bottom and the sidewalls of the channel unitl the front end is again passed through a binding mechanism 512 downstream of the driving mechanism 510. The binding mechanism 512 is the same as that illustrated in FIG. 3. A cutting member 513 arranged between the driving mechanism 510 and the binding mechanism 512 cuts the required length from the stock, whilst the binding mechanism 512 twists the loose ends of the length of binder around one another and thus couples them together.

The binding mechanism according to the present application is distinguished in that the bottom of the channel 511 extends along a flowing curve, whose radii of curvature do not attain anywhere an infinite value so that no straight portion will be found anywhere.

The pressing space left in the compression chamber 51 after the pressing member 52 has attained its pressing position is, however, polygonal and in the embodiment shown a rectangle. If a channel 511 would precisely follow the circumference of the compression space and thus have the shape of a rectangle with rounded-off corners, the binder would be deformed after having passed the first corner to an extent such that along the straight portions the front end would project out of the channel and insert itself into the bale of crop. Thus the binder would be jammed. Owing to the flowing shape of the guide channel 511, this drawback is obviated.

In the embodiment shown the channel 511 extends along the straight portions of the polygonal circumference of the compression chamber outside the latter, whereas at the corners it extends inside the space of the compression chamber. This has the advantage that the length of the binder is restricted. Nevertheless the binder has to be moved from the position near the bottom of the channel indicated by the dot-and-dash line A into the position indicated by the dotted line B. This is enabled by the reversible function of the driving mechanism 510, so that after the passage of the binder 59 the driving mechanism 510 can withdraw the excess binder.

In order to ensure that the binder is not withdrawn too far, the clamping mechanism 514 is provided in the channel immediately in front of the binding mechanism 512. On the other side of the binding mechanism 512 a member 515 is provided for temporarily closing the channel, said member being shown in the perspective view in FIG. 10. It comprises a hook-like element adapted to be turned by a lever 516 around a pin 517 so that in the retracted position the channel is released in downward direction and the channel is closed in the operative position. The member serves for holding the binder 59 in the correct position in front of the binding mechanism 512 so that the two loose ends of the binder 59 can be twisted around one another.

In order to obtain a bias tension of the binder 59 around a bale of crop, the driving mechanism 510 can exert a high tensile force on the binder by means of a weight 523, which urges, via a rocker 524, the lower driving wheel of the driving mechanism 510 against the upper driving wheel so that the clamping force exerted on the binder is enhanced.

If necessary, a pair of registering rollers 518 may be arranged behind the pair of driving wheels of the driving mechanism 510 to ensure that the binder is passed without bends into the channel 51.

After the two ends of the binder have been twisted in around one another by means of the gear wheel 24 toothed rack mechanism 35 as previously described in conjunction with FIG. 3 the bound bale may be discharged. As shown in FIG. 8, the discharge end of the compression chamber is formed by the closure member C which is swingable about the pivot P. This closure member is connected by the links L (one on either side) to the corresponding actuators 53. Thus, when the actuators are operated, the closure member swings upwardly as shown in dashed lines to allow the bound bale B to discharge by gravity, as illustrated opened in the manner illustrated in FIG. 8, in which the hindmost portion of the compression chamber is tilted up and the bound bale can drop by gravity.

It may be advantageous to provide in the binding mechanism 512 a pair of expelling elements 520 shown in FIG. 10 in the form of a plurality of strips arranged outside the binder and rigidly secured to a spindle 521 rotatable in bearings and being simultaneously actuable by a lever 522. The strips 520 thus move downwards, whilst the twisted ends of the binder are pressed out of the slot of the binding mechanism.

The invention is not limited to the embodiments described above.

What is claimed is:

1. A device for compressing crop, for example, grass, hay or the like to bales, comprising a compression chamber and a driven plunger reciprocating in said chamber characterized in that the compression chamber as well as the plunger are each provided with at least one channel opening towards the compression space so that in the extreme position of the plunger the channel of the compression chamber and that of the plunger constitute an uninterrupted, annular conduit for passing a length of binder, there being provided a mechanism for fastening the two ends of the length of binder to one another, at least part of the channel being formed by two parallel ridges arranged at a distance from one another on the inner wall of the compression chamber and on the pressing side of the plunger.

2. A device as claimed in claim 1 characterized in that the edge of each of the ridges facing the compression space is bent over so that the edges of the ridges forming the channel are in contact with one another, whilst the ridges can deflect away from one another.

3. A device for compressing crop, for example, grass, hay or the like to bales, comprising a compression chamber and a driven plunger reciprocating in said chamber characterized in that the compression chamber as well as the plunger are each provided with at least one channel opening towards the compression space so that in the extreme position of the plunger the channel of the compression chamber and that of the plunger constitute an uninterrupted, annular conduit for passing a length of binder, there being provided a mechanism for fastening the two ends of the length of binder to one another, the fastening mechanism comprising a part of the channel adapted to rotate about an axis parallel to the direction of guiding and driving means for the occasional rotation of said channel part.

4. A device a claimed in claim 3 characterized in that a rigid undeformable channel part is arranged on either side of the rotatable channel part.

5. A device as claimed in claim 2 characterized in that the rotatable channel part is formed by a toothed wheel driven by a toothed rack provided with a radial slot.

6. A device as claimed in claim 3 characterized in that each annular guide is provided with a binder stock reel, a conveying member for passing an appropriate length of binder through the guide and a cutting mechanism for cutting said length.

7. A device for compressing crop, for example, grass, hay or the like to bales, comprising a compression chamber and a driven plunger reciprocating in said chamber characterized in that the compression chamber as well as the plunger are each provided with at least one channel opening towards the compression space so that in the extreme position of the plunger the channel of the compression chamber and that of the plunger constitute an uninterrupted, annular conduit for passing a length of binder, there being provided a mechanism for fastening the two ends of the length of binder to one another, the bottom of the channel extending along a flowing curve having radii of curvature differing from the infinite value.

8. A device as claimed in claim 5 characterized in that with a compression space of polygonal cross-section the bottom of the channel extends along the straight portions of the polygon outside and at the corners inside the circumference of the compression space.

9. A device as claimed in claim 5 characterized in that the feeder mechanism for the binder is operable in a reversible sense and in that a clamping member is arranged in the channel in front of the fastening mechanism, viewed in the direction of passage.

10. A device as claimed in claim 5 characterized in that the rear side of the fastening mechanism, viewed in the direction of passage, is provided with a member closing the channel opening.

11. A device as claimed in claim 7 characterized in that the fastening mechanism is provided with at least one expelling member.

12. A device as claimed in anyone of claim 8 to characterized in that the driving mechanism comprises a plurality of meshing rollers which are biassed against one another.

13. A device as claimed in claim 10 characterized in that the fastening mechanism is provided with a pair of registering rollers for straightening the binder.

14. In a crop compressing device which comprises a frame having a compression chamber, a plunger reciprocable in said chamber, means for feeding cut crop to said chamber, and drive means for periodically operating said plunger to form a bale of cut crop within said chamber, the improvement which comprises:

conduit means partly on said frame and partly on said plunger for forming a closed, encircling path around a bale when the plunger is in full compression position;

feed means for feeding binder wire into said conduit means and along the path formed thereby until the standing and running ends of the binder wire overlap;

means for twisting the overlapped ends of binder wire together; and means for cutting the standing end of the binder wire.

* * * * *